United States Patent [19]
Watson

[11] Patent Number: 5,611,307
[45] Date of Patent: Mar. 18, 1997

[54] INTERNAL COMBUSTION ENGINE IGNITION DEVICE

[75] Inventor: Harry C. Watson, Eltham, Australia

[73] Assignee: The University of Melbourne, Parkville, Australia

[21] Appl. No.: 256,360

[22] PCT Filed: Oct. 14, 1992

[86] PCT No.: PCT/AU92/00552

§ 371 Date: Apr. 7, 1995

§ 102(e) Date: Apr. 7, 1995

[87] PCT Pub. No.: WO93/08385

PCT Pub. Date: Apr. 29, 1993

[30] Foreign Application Priority Data

Oct. 14, 1991 [AU] Australia .................... PK8881

[51] Int. Cl.$^6$ ........................................ F02B 19/18
[52] U.S. Cl. ............................ 123/254; 123/259
[58] Field of Search ................ 123/259, DIG. 12, 123/254

[56] References Cited

U.S. PATENT DOCUMENTS

| | | | |
|---|---|---|---|
| 3,970,054 | 7/1976 | Henault et al. | 123/DIG. 12 |
| 4,140,090 | 2/1979 | Lindberg | 123/265 |
| 4,306,526 | 12/1981 | Schaub et al. | 123/259 |
| 4,319,552 | 3/1982 | Sauer et al. | 123/267 |
| 4,343,272 | 8/1982 | Buck | 123/297 |
| 4,448,160 | 5/1984 | Vosper | 123/297 |
| 4,546,740 | 10/1985 | Clements et al. | 123/304 |
| 5,081,969 | 1/1992 | Long, III | 123/274 |
| 5,085,176 | 2/1992 | Brinkley, III | 123/DIG. 12 |

FOREIGN PATENT DOCUMENTS

1198776  9/1977  Australia .

*Primary Examiner*—Andrew M. Dolinar
*Attorney, Agent, or Firm*—Dennison, Meserole, Pollack & Scheiner

[57] ABSTRACT

An ignition device for an internal combustion engine comprising a smal pre-chamber 1 having a volume of about 0.7 of the volume of an associated combustion chamber, a small outlet orifice 1a in a pre-chamber having a dimensionaless throat parameter of about 0.4 to 0.7, a valve 2 controlling the introduction of hydrogen gas to the pre-chamber 1 via a valve driver 3 and a spark plug 4 for igniting the hydrogen rich mixture (about 3 times stoiciometric) in the pre-chamber to cause an ignition jet of burning gas to issue from the orifice 1a to promote efficient combustion and to reduce NOx emissions at lean burning mixtures and at higher compression ratios without knock.

12 Claims, 6 Drawing Sheets

INTERNAL COMBUSTION ENGINE IGNITION DEVICE

REFERENCE TO CO-PENDING APPLICATION

This is a continuation-in-part Application of International PCT/AU92/00552, filed 14 Oct. 1992, for INTERNAL COMBUSTION ENGINE IGNITION DEVICE, which Application designated the United States, and is now abandoned.

FIELD OF THE INVENTION

This invention relates to ignition devices for internal combustion engines, and more particularly hydrogen assisted jet ignition (HAJI) devices for improving combustion efficiency. In the present specification, the term "hydrogen" is intended to include hydrogen and other fast-burning fuels.

BACKGROUND OF THE INVENTION

Simultaneous control of exhaust emissions and thermal efficiency is an established goal in engine design. Optimization of engine design is limited by Cycle by Cycle Variability (CBCV), especially for spark ignition engines. CBCV is observed as either variations in the pressure diagram or as variations in flame propagation between consecutive engine cycles. In the vehicle the consequent unsteadiness in delivered engine power results in uneven vehicle progress which has been termed surge. Combustion variations require compromises in engine design, the setting of mixture composition and spark timing. This reduces engine power and efficiency at full load in order to meet roughness, noise, and octane requirements and at part load and idle reduces fuel economy and increases exhaust emissions in order to control surge.

If CBCV could be eliminated, the engine would run at its best economy settings and still produce a smooth and steady output. In addition, the fuel octane requirements could be reduced, or the compression ratio raised, with a consequent improvement in efficiency. Further, the lean limit of engine operation could be extended, resulting in a reduction in exhaust emissions and an improvement in thermal efficiency. It has been shown that the reduction of CBCV in lean-burn engines, together with control of ignition timing, can reduce NOx emissions and at the same time improve engine thermal efficiency. Another important benefit arising from control of cycle variations is the reduction in engine surge and improved vehicle driveability while cruising.

Much research has been conducted on lean-burn engines with the intention of improving efficiency and reducing emissions. The benefits from the lean combustion approach can be theoretically explained as follows. The excess air improves the engine's thermal efficiency by increasing the overall specific heats+ ratio, by decreasing the energy losses from dissociation of the combustion products, and by reducing the thermal losses to the engine cooling system. In addition, as the flame temperature drops with decreasing fuel air ratio, the NOx production is exponentialy reduced and the excess air may promote a more complete reaction of CO and hydrogen fuel emission from crevices and quench layers.

It is concluded that at the present state of development, U.S. emission standards present a considerable challenge to the realization of the fuel economy advantages theoretically inherent in lean burn engines. On the other hand, even though the incentives for lean burn application to automotive engines are valid and have good theoretical foundation, its implementation is a complex problem that requires several conflicting requirements to be satisfied simultaneously. Lean burn operation increases the CBCV and deteriorates vehicle driveability. CBCV increases with increasing air-fuel ratio.

Many attempts have been made to improve combustion efficiency. Such attempts include fuel stratification with a rich mixture in the spark plug region, divided or pre-chamber engines alone or in combination with stratification, and hydrogen enrichment of the whole fuel charge. None of these attempts have been entirely successful and the problems referred to above remain in evidence.

In the case of non-fuelled divided chamber engines, including the Bosch spark plug patented around 1978, the size (volume, connecting passage length and aperture) of the pre-chamber can only improve combustion at a particular power output. Thus, while combustion efficiency can be improved at a given power output, energy tends to be lost at full power to the pre-chamber walls and other parts of the main chamber by the impinging jet so that the peak power was reduced by about 10%. Furthermore, since the pre-chamber in the prior art arrangements is unfuelled, relying on the transfer of a fuel mixture from the main chamber, starting in cold conditions can be difficult.

In a paper entitled "High Chemical activity of incomplete combustion products and a method of pre-chamber torch ignition for avalanche activation of combustion in internal combustion engines" by L. A. Gussak of the Institute of Chemical Physics Academy of Sciences of the USSR, Moscow. (Publication No. 750890 of Society of Automotive Engineers USA) the author discusses the effects of pre-chamber torch ignition on the flame front of a hydrocarbon-air mixture and concludes that optimization is achieved by employing a pre-chamber volume of two to three percent of the compressed combustion chamber volume. While this paper contains some scientific consideration of the combustion products resulting from pre-chamber combustion of a very rich air-hydrogen mixture, the author does not come to any conclusion concerning the likelihood of pre-chamber combustion providing a significant benefit in the improvement of engine thermal efficiency while at the same time reducing NOx emissions.

The Patent literature also contains some reference to the burning of hydrogen in pre-chambers, the most pertinent prior art being U.S. Pat. No. 4,140,090 Lindburg and U.S. Pat. No. 4,760,820 Tozzi. The Lindburg reference provides a small pre-chamber for burning hydrogen but specifically teaches the introduction of an oxidant to be mixed with the hydrogen fuel to ensure stoiciometric proportions. The reference is also silent at the nature of the exit passage. The present applicant has found that the mixture in the pre-chamber should preferably be hydrogen rich and the outlet orifice should be carefully dimensioned to ensure that a proper ignition jet stream issues from the orifice to ensure complete combustion of a lean fuel mixture in the combustion chamber.

In the case of the Tozzi reference, the magnetic field generating means introduces undesirable complexity and increased power consumption to generate plasma temperatures of around 4,000° to 6,000° C. Plasma igniters of the type described by Tozzi have not employed commercial success presumably due to the complexity and power consumption difficulties involved.

SUMMARY OF THE INVENTION AND OBJECT

It is an object of the present invention to provide an ignition device by means of which combustion efficiency is improved and the problems outlined above are at least ameliorated.

The invention provides an ignition device for an internal combustion engine having combustion chamber(s), comprising a small pre-chamber having a volume substantially falling within the range of 0.5% to less than 2% of the combustion chamber volume, said pre-chamber being closed to the combustion chamber except for one or more small outlet orifices, means for creating a rapidly combustible mixture in said pre-chamber, means for igniting the combustible mixture in the pre-chamber, said pre-chamber and said orifice(s) being dimensioned to thereby cause an ignition jet of burning gas to issue from said orifice in a manner which promotes efficient combustion within the combustion chamber(s) internal combustion engine.

The outlet orifice(s) and the pre-chamber are preferably dimensioned to provide a dimensionless throat parameter number $\beta=$ $$\left( \frac{\text{area of throat} \times \text{bore of combustion cylinder}}{\text{pre-chamber volume}} \right)$$

substantially falling within the range 0.3 to 0.8, and preferably within the range about 0.4 to 0.7, and most preferably about 0.4 to 0.6.

By the use of the above ignition device, and particularly by selection of the dimensionless throat parameter $\beta$ within the above range, idle combustion variability is nearly eliminated, even at lean burn operation. At the same time, low levels of emissions are obtained and unthrottled operation is possible with some sacrifice in efficiency, but with near zero NOx emissions.

The volume of the pre-chamber is preferably as small as is practically possible, the lower limit of the chamber volume being dictated largely by the ability to physically form the pre-chamber. Pre-chamber volumes of about 0.5% have been achieved with difficulty, while pre-chamber volumes of about 0.7% have been readily achieved and offer the advantage of being capable of location within the diameter of a standard spark plug connecting portion.

While the availability of hydrogen as a fuel source for combustion within a pre-chamber is known from the Gussak paper referred to above and from other sources, the ability to significantly reduce the size of the pre-chamber as defined above has not been recognized before the present invention. Of course, the ability to reduce the size of the pre-chamber not only enables the pre-chamber to be incorporated into a modified spark plug having standard attachment dimensions, but also significantly reduces the total heat losses during the combustion process thereby resulting in surprising improvements in lean mixture combustion and consequential reductions in NOx emissions. Until the present invention, it was always expected that a pre-chamber volume at least as large as that stated by Gussak to provide optimization of pre-chamber combustion would be necessary to form the necessary torch ignition to achieve the expected benefit from this process. It was surprisingly determined that significantly smaller volumes could be used without compromising the effectiveness of the ignition jet of burning gas produced from the pre-chamber combustion process. It has also been surprisingly determined that by selecting an orifice throat size $\beta$ between about 0.3 and 0.8 engine efficiency is maximised for lean burning mixtures.

The large surface area to volume ratio of the pre-chamber ensures that the residual gas in the pre-chamber is at low temperature, a requirement for low NOx emission from this region as the gas expands into the main chamber during expansion. The jet of combustion products, at sonic or near sonic velocity from the small volume of the prechamber, into the main chamber hydrocarbon fuel initiates a distributed reaction in an ultra lean mixture, which can be much leaner than the normal lean flammabilty limit. The distributed reaction is triggered by the presence of chemically active species in the jet and allows nearly spatially homogeneous burning with excellent repeatability and hence close to spatially uniform temperatures. Along with the ability to use ultra lean mixture this process avoids the higher temperatures found in the region of the first burned gas in the spark ignition engine in the region of the spark plug or in the richer mixture around the fuel jet in the diesel engine which are the source of high NOx emissions.

A preferred fast burning fuel is hydrogen which may be introduced to the pre-chamber from a suitable source or may be produced in-situ within the pre-chamber by catalysis. The amount of hydrogen introduced may be varied, and may be as low as 0.2% of the fuel charged to the engine. The hydrogen/air mixture in the pre-chamber is preferably greater than stoiciometric and may be from about 1.2 to 7 times stoiciometric or higher, without about 3 times being an effective median value.

The ten times faster flame speed of hydrogen compared with hydro-carbon fuels substantially reduces the variation in the time for ignition kernel growth, thus virtually eliminating CBCV in combustion under idle and light load conditions. This permits the burning of lean mixtures in the main chamber; the mixtures may be so lean that throttling may be eliminated whereby thermal efficiency increases and NOx emissions reduced by as much as three orders of magnitude.

The pre-chamber may be formed as part of a replacement spark plug, or may be formed as part of the cylinder head in the region of the spark plug receiving opening. The means for igniting the combustible mixture may comprise a miniature spark plug, or some other form of spark generating means formed integrally with the means for introducing hydrogen or other rapidly combustible gas into the pre-chamber.

The invention also provides a method of operating an internal combustion engine having combustion chamber(s) comprising the steps of introducing a rapidly combustible mixture into a pre-chamber associated with each combustion chamber of the combustion engine and having a volume substantially falling within the range 0.5% to less than 2% of the combustion chamber volume, igniting the mixture in the pre-chamber to create a burning fuel ignition jet from one or more exit orifices of the pre-chamber, said jet being controlled to promote efficient combustion within the combustion chamber of the internal combustion engine.

BRIEF DESCRIPTION OF THE DRAWINGS

In order that the invention may be more readily understood several embodiments of the invention will now described with reference to the accompanying drawings in which.

DESCRIPTION OF PREFERRED EMBODIMENTS

Hydrogen or reformed fuel containing a high proportion of hydrogen is made in or introduced into a pre-chamber of a volume so small that it may be formed in the spark plug. Examples of possible design configurations are shown in FIGS. 1 to 3.

Figure 1:
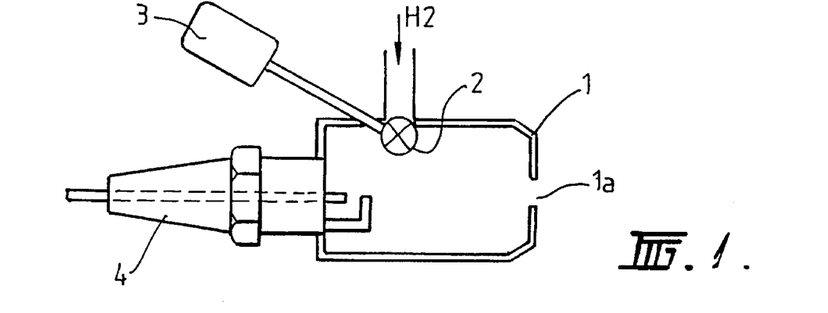
FIG. 1 shows schematically an ignition device according to a first embodiment of the invention.

FIG. 1 shows the arrangement whereby the hydrogen gas is introduced into a pre-chamber 1 having an outlet orifice 1a by a small value 2 operated by a valve driver 3 and the mixture ignited by a miniature spark plug 4. Low pressure delivery (about four atmospheres) of hydrogen is used in each of the embodiments of FIGS. 1, 3 and 4, so that the pressure of hydrogen delivery is not greater than the fuel supply pressure to the combustion chamber.

Figure 2:
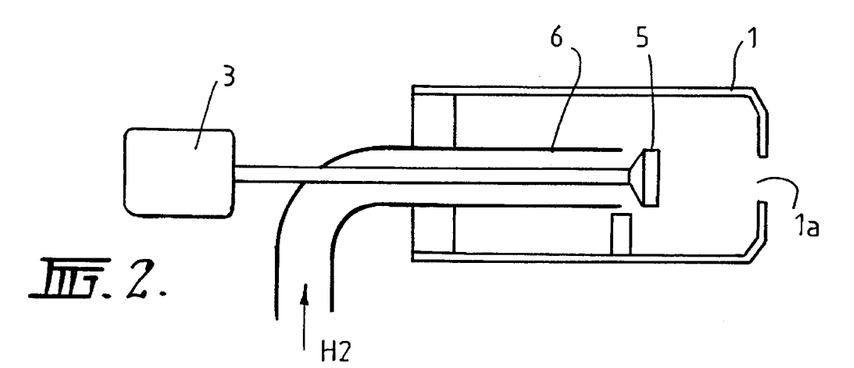
FIG. 2 schematically shows an ignition device according to a second embodiment of the invention.

FIG. 2 shows an arrangement in which the spark pug central electrode is constituted by the hydrogen admission valve 5 which defines a spark gap within the gas inlet 6 when the valve is open one unit serving both functions. In this case the hydrogen may be supplied from storage vessels or by the reformation of small amounts of fuel outside the pre-chamber. The hydrogen may be contaminated by the products of reformation.

Figure 3:
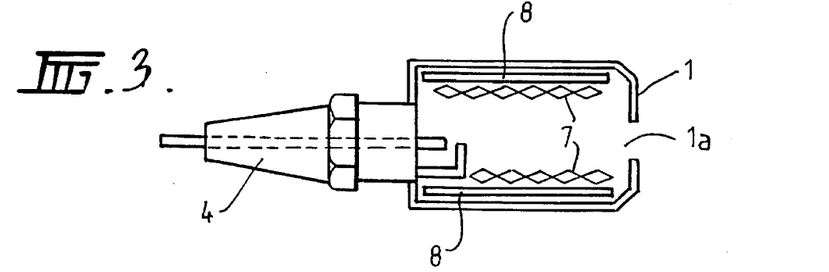
FIG. 3 schematically shows a third embodiment of the invention.

FIG. 3 shows a schematic of the pre-chamber in which the hydrogen is generated by a reforming catalyst 7, the rate of reformation and thus the amount of hydrogen produced being controlled by the catalyst bed temperature, which here is illustrated by means of electrical heating means 8 under control of an engine management computer (not shown). In this case, if the amount of fuel within each cylinder is insufficient to produce a greater than stoiciometric hydrogen mixture, and the effectiveness of the hydrogen assisted jet ignition system is reduced thereby, additional hydrocarbon fuel may be introduced into the pre-chamber to form a hydrogen-rich mixture, or small amounts of hydrogen can be directly injected to supplement the hydrogen produced by catalysis.

The invention is applicable to both four and two-stroke engines.

The amount of hydrogen introduced or reformed fuel produced by catalysis may be varied but small amounts of the order of 0.5 to 2% by mass have been found to produce acceptable results. The mixture in the pre-chamber should be greater than stoichiometric and from 1.2 to 7 times stoiciometric or higher is acceptable, with 3 times constituting a reasonable median value. The ten times faster flame speed of hydrogen compared with hydrocarbon fuels substantially reduces the variation in the time for ignition kernel grown and thus virtually eliminates cycle-by-cycle variation in combustion under idle and light load conditions. The exodus of the partially combusted hydrogen and hydrocarbon fuel in the pre-chamber provides a jet of enthalpy and reacting products which cause the fuel-lean main chamber products to burn at much lower temperatures and stoichiometry than is possible with a localized ignition source.

The burning of a lean mixture in the main chamber may be sufficiently lean that throttling may be eliminated and thus thermal efficiency increased by eliminating pumping work and nitrogen oxide emissions reduced by as much as two orders of magnitude by the more uniform low temperature combustion.

Further, because combustion of the mixtures needed for maximum power is so fast the onset of knock is delayed and compression ratios may be increased, thus increasing both power output and efficiency.

The volume of the pre-chamber will be less than 2% of the main combustion chamber clearance volume, and may be as low as 0.5%. This is significantly smaller than prior art pre-chambers, e.g. VW, at 17% and Gussak at 2 to 3%. The number of pre-chamber orifices 1a, orifice throat shape and their direction with respect to the main chamber may be varied and optimized for a particular engine configuration. These parameters are chosen to ensure that the ignition jet or jets issuing from the orifice(s) penetrate the combustion chamber of the engine to such an extent as to maximize efficient combustion. Sharp edges should be avoided when forming the orifice 1a. By correctly choosing the above parameters, the ignition jet penetrates to a position approximately coincident with the centre of the cylinder, and ignition is then found to be extremely regular. To ensure a jet ignition gas stream is achieved, the orifice should have a dimensionless throat parameter $\beta=$ $$\frac{\text{area of throat} \times \text{bore of combustion cylinder}}{\text{pre-chamber volume}}$$

falling within the range about 0.3 to 0.8.

Figure 3A:
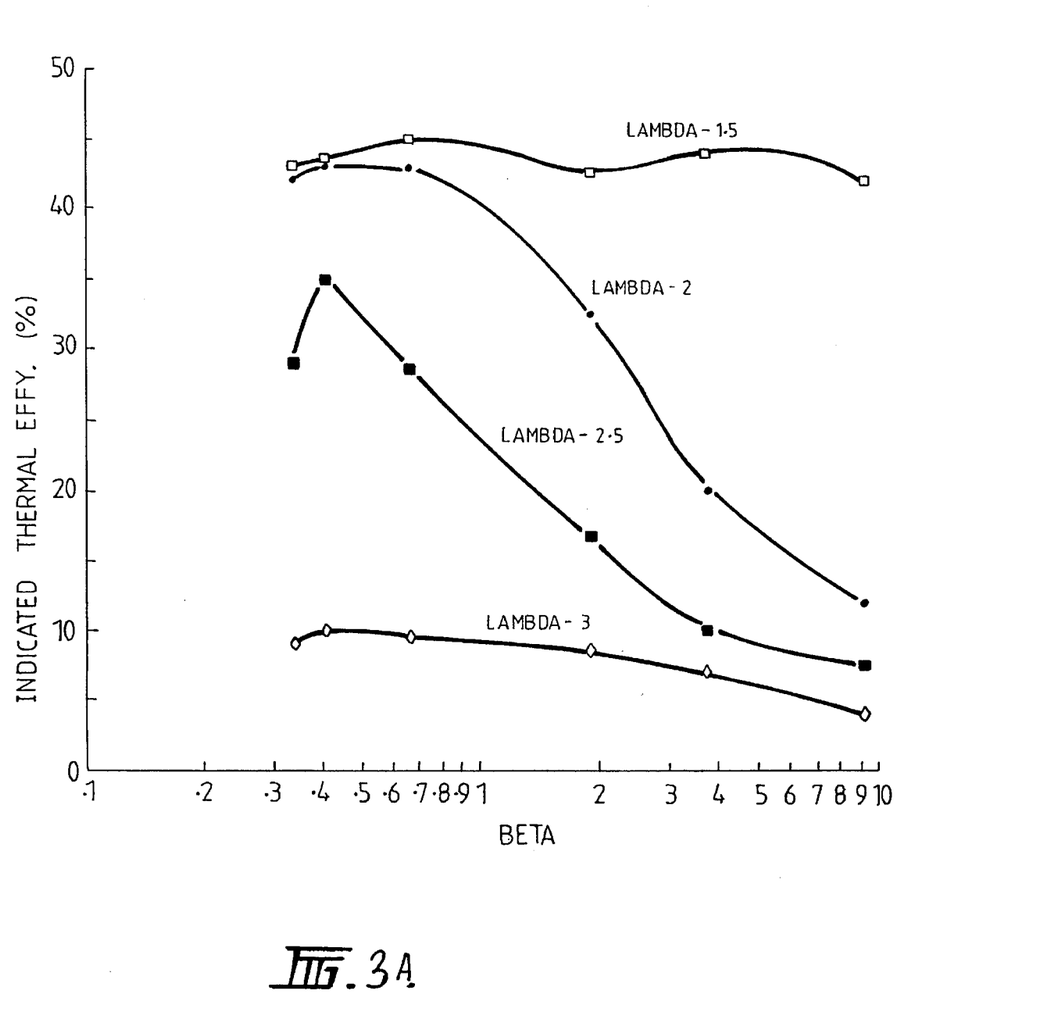
FIG. 3a is a graph showing changes in indicated thermal efficiency with various values of the dimensionless throat parameter $\beta$.

In this regard reference is made to FIG. 3a, which details test results of various pre-chamber orifices, described by the dimensionless throat parameter $\beta$ "beta". The engine on which the tests were carried out was the Wakesha Cooperative Fuel Research Engine (CFR) used for octane rating petrols. The engine was operated at 600 rev/min, the speed used for the research octane number determination. Ignition timing was set at the minimum advance for best torque (MPT) in all cases, the compression ratio was at 9:1 and the fuel supplied to the main chamber was petrol. All tests were at wide open throttle (WOT). The relative air/fuel ratio (to a base of the stoichiometric air/fuel) "lambada", sometimes known as the excess air fuel ratio, and is the abscissa for the graphs. The indicated thermal efficiency, the ordinate of the graphs, is basedon the net (lower) heating value of the fuel. It is clean from the results that the throat size "beta" should preferably be in the range of about 0.4 to 0.7 for optimum thermal efficiency, although the range 0.3 to 0.8 provides acceptable efficiency.

Figure 4:
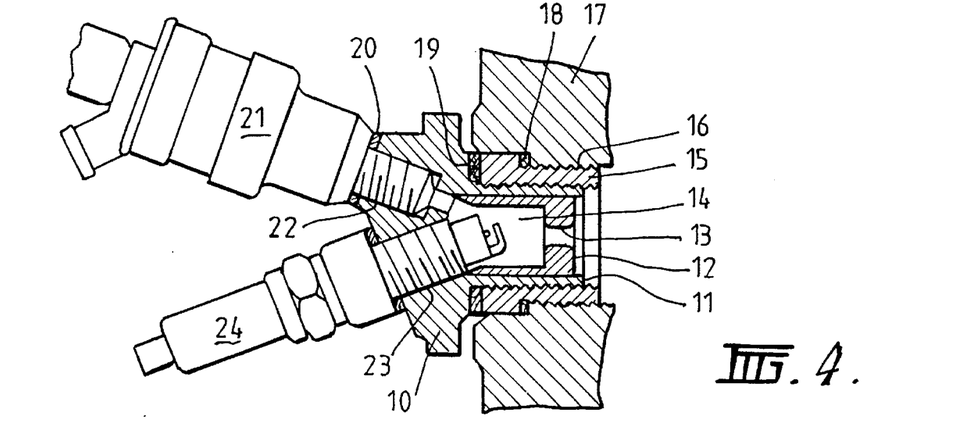
FIG. 4 is a sectional elevation of an ignition device according to a test prototype.

FIG. 4 shows an experimental ignition device embodying the invention which has been subjected to testing using a high speed, single cylinder CFR engine burning methanol fuel. The ignition device comprises a body 10 having a cylindrical portion 11 within which a throat insert 12 having an outlet orifice 13 of about 1.5 mm diameter received to define a pre-chamber 14 having a volume of about 0.7 cc. This yields a throat parameter β of about 0.4. The cylindrical portion 11 threadably engages an adaptor 15 which in turn threadably engages the spark plug opening 16 in the cylinder head 17 of the engine. Gaskets 18, 19 and 20 are positioned to seal the adaptor 16 to the cylinder head 17 and the body 10 to the adaptor 16, while the gasket 20 seals a hydrogen gas injector 21 in an injector opening 22 formed in the body 10. A spark plug receiving opening 23 in the body 10 receives a spark plug 24, the electrodes of which project into the pre-chamber 14.

If desired, the pre-chamber may be formed within the cylinder or as an attachment to the cylinder, although these options are less attractive than forming the pre-chamber in a spark plug body.

The tests conducted using the above described prototype, referred to in the following description as the hydrogen assisted jet ignition (HAJI) system, relate to an engine speed of 600 r/min for two reasons: first, it is at low speed, low loads that combustion variability is most noticeable as engine surge under load or vibration at idle; second, this is the speed for research octane number (RON) measurement. Thus, the effects of the ignition system on the octane requirement, or more specifically, the highest usable compression ratio as a surrogate for octane number, may be identified.

A wide range of parameters may be employed to describe variability in engine combustion. These may be related to the cylinder pressure, p, the magnitude or the phasing of pressure characteristics such as peak p or maximum value of dp/dt or the cycle integral value of pressure ($w_c$). Two measures are used here: the coefficient of variation in peak cylinder pressure, COVp^ (standard deviaton/mean) and the coefficient of variation of the indicated specific work (or i.m.e.p.) per cycle, $COVw_c$. Fluctuations in the former influence the maximum structural reactive forces and peak cycle temperatures and in the latter, variability in the indicated thermal efficiency η. The indicated value of $w_c$ is selected rather than the brake value, as the mechanical efficiency of the 'high speed' CFR engine is unusually low because of its balancing pistons and belt drive arrangement. Emissions of HC, CO and NOx are also presented on an indicated specific basis i.e. g/MJ.

The experimental data space has been limited in this presentation to: main chamber mixture composition expressed as λ, the relative air/fuel ratio; three manifold air pressures, 95, 73 and 0 kPa, described as full, half and a quarter throttle, respectively; hydrogen injection timing, $θ_{H2}$; hydrogen injection quantity expressed as a proportion of the fuel mass supplied, $M_{H2}$ and compression ratio, r. The spark timing $θ_{ign}$ was always adjusted for the minimum advance of best torque (MBT); and the main chamber injection timing was at maximum inlet value lift (98°ATDC) for optimum efficiency in the CFR engine.

The effect of changing the main chamber fuel composition for the range of λ=1 to 3.5 for full throttle and smaller range at part throttle was studied. Even at full throttle it was possible to reduce the work per cycle $w_c$ (and the torque) to no load quantities by increasing the relative air/fuel ratio, whereas the lean limit for this engine with normal ignition is shown to occur at λ=1.64, there exists no lean limit with hydrogen assisted jet ignition, HAJI, within the usable range of $w_c$. However, it was observed that there is some advantage in throttling the engine as at the smallest values of $w_c$ thermal efficiency, η is higher at a quarter throttle. The peak thermal efficiency η is about two percentage points higher with HAJI over the standard system.

The range of ignition timing needed for operation from full to no load ($w_c$–820 to 18 kJ/m³) was found to be small and retarded compared with conventional ignition. At full load $θ_{ign}$ is after TDC. For all operating conditions as seen in the COVp^ was found to be very low and rising only slightly at the lowest values of $w_c$ at full and half throttles. Usually under light load, this engine has a COVp^ of about 0.2 with the standard ignition system. Whilst these exists substantially regular burning to peak pressure, the $COVw_c$ variations in the later burning phases of mixtures leaner than those for maximum η are observable. The failure to burn all of the main chamber fuel, at least in some cycles, is evidenced by an upturn in specific HC and CO emission at full and half throttle as observed in FIG. 5.

Figure 5:
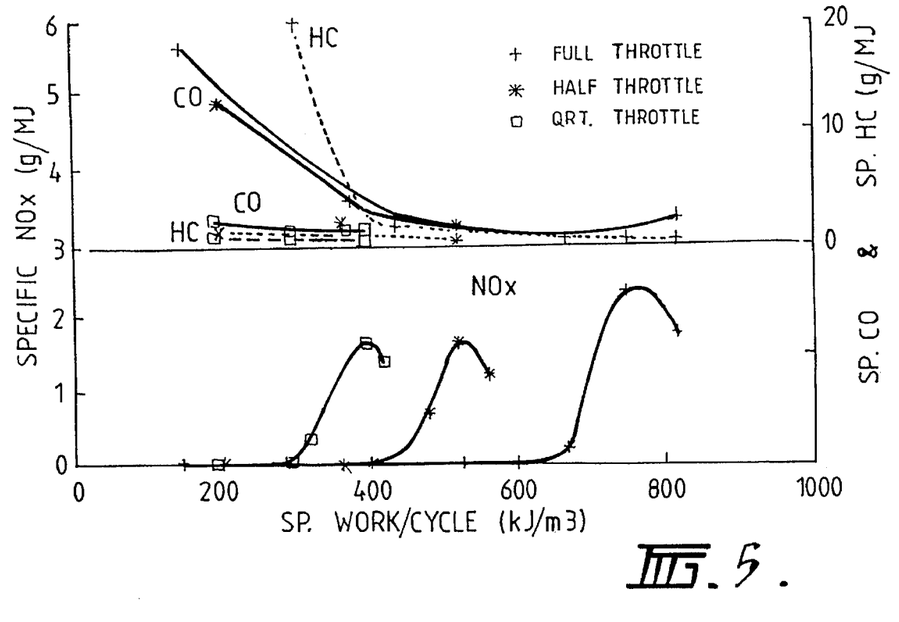
FIG. 5 is a graph showing the variation on specific HC, CO and NOx emissions with variations of specific work with hydrogen at about 0.8% methanol by mass, injected at 90° crank angle BTDC at $\gamma=9$.
Figure 5A:
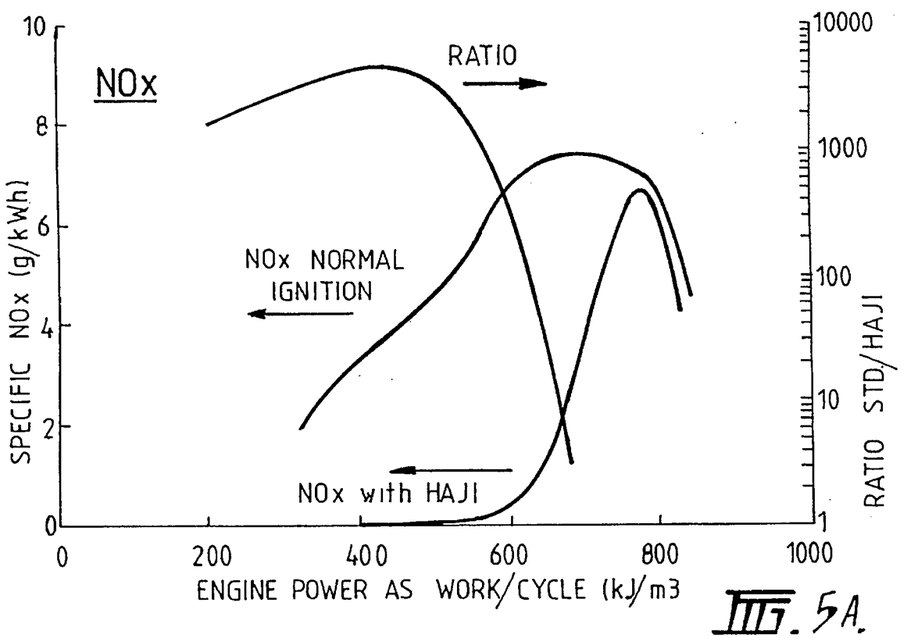
FIG. 5A is a graph showing variations in NOx emissions with engine power as work/cycle for normal ignition and for the case of the invention.

The benefits from leaner operation, well beyond the standard engine's lean limit, is evidenced in FIG. 5 where a substantial range of operation at specific NOx values of 0.03 g/MJ or much less than one hundredth of the peak NOx. Under these conditions the exhaust NOx concentrations are less than 1 ppm. The variation in NOx emissions with engine power from the invention and for standard combustion is illustrated in FIG. 5A.

At full throttle these low values of NOx are obtained at $w_c$ less than 600 kJ/m³ (i.e. for values of torque less than 70% of the maximum) a point at which the HC and CO are comparatively low and the η for $w_c$=530 kJ/m³, λ=2.15 is a maximum of 40%. Maximum efficiency at half and quarter throttles also correspond with very low NOx values and the advantage of throttling lies in avoiding the falling efficiency at full throttle when λ>3 and the reduced exhaust HC and CO under light load ($w_c$) conditions.

Very small quantities of hydrogen were injected into the pre-chamber to obtain the very low NOx and high η demonstrated in FIG. 5. The sensitivity to pre-chamber $H_2$ injection timing (influencing mixing time) and quantity (influencing stoichiometry) have been investigated.

Figure 6:
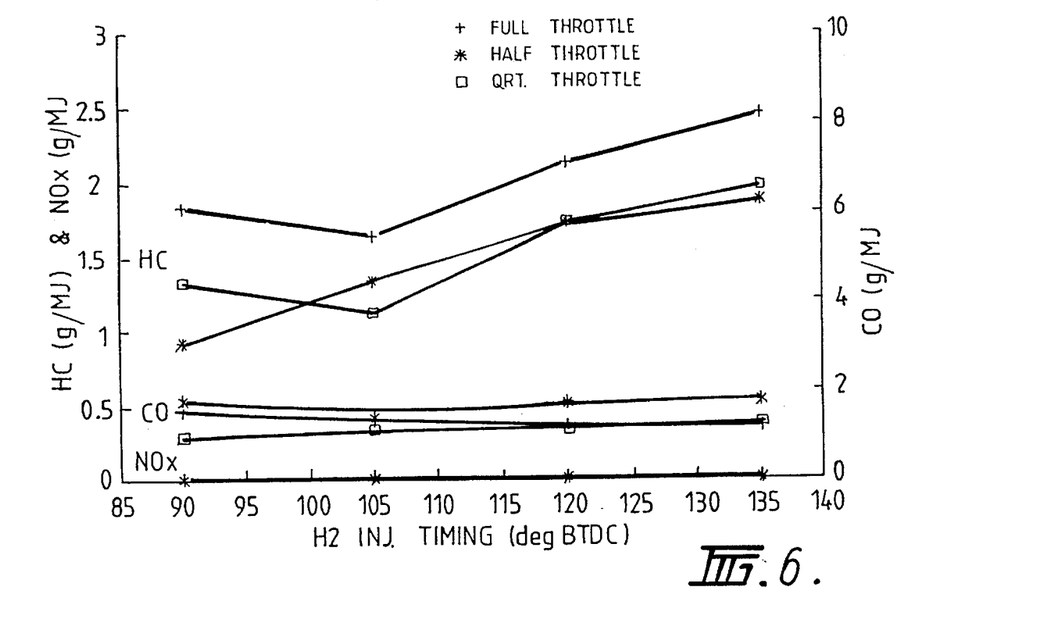
FIG. 6 is a graph showing the variation of HC, CO and NOx emissions with pre-chamber H2 injection timing at optimum efficiency mixture of $\lambda=2.1$, 1.98 and 1.6 at full, half and quarter throttle respectively.

The sensitivity of the engine's performance to $H_2$ injection timing for the mixture corresponding to maximum efficiency at each throttle position was also considered and it was found that η is independent of timing at full throttle but there is a small advantage (an increase of 2% in η) at part throttle by using about 100° BTDC injection timing. More advanced injection requires slightly more advanced spark timing (but very much less than that of the standard engine which is 38° BTDC at a quarter throttle, for example). The combustion variability as $COVw_c$ varies slightly with injection timing, but at advanced timing and half throttle, $COVw_c$ is nearly twice tat at full throttle. This trend is even more evident in COVp^ where minima occur close to the timing of 100°BTDC. There is a trend also for both HC and CO emissions (FIG. 6) to minimise with increasing CO and HC.

Figure 7:
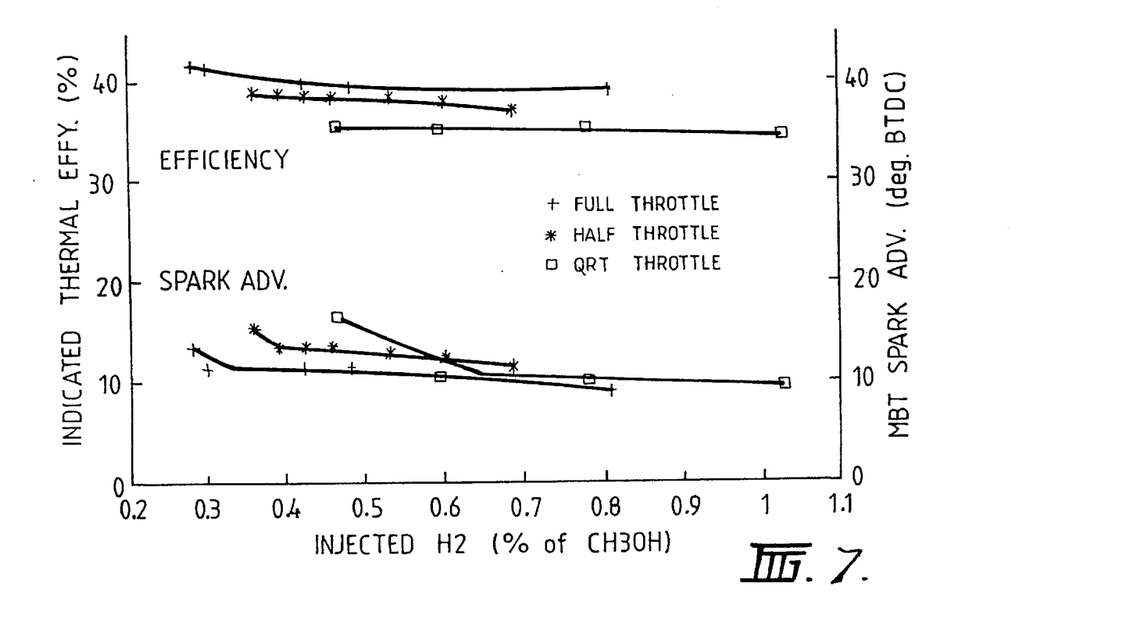
FIG. 7 is a graph showing the effect of the amount of pre-chamber H2 injection on efficiency and spark advance at the same optimum efficiency mixtures and throttle settings referred to in relation to FIG. 6.
Figure 8:
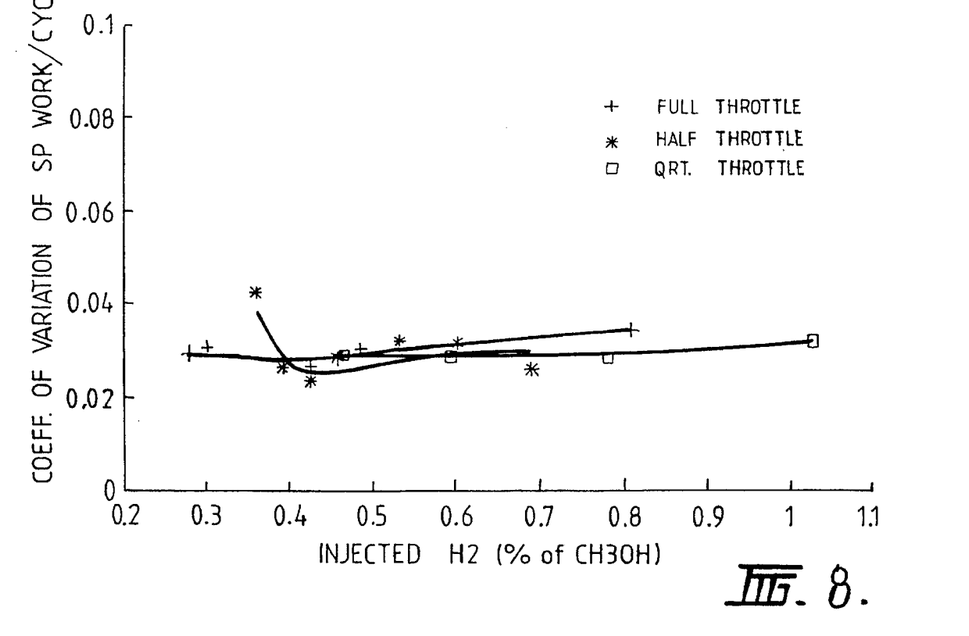
FIG. 8 is a graph showing the variation of COV of specific work per cycle with amount of pre-chamber H2 injection at the same optimum efficiency mixtures and throttle settings.
Figure 9:
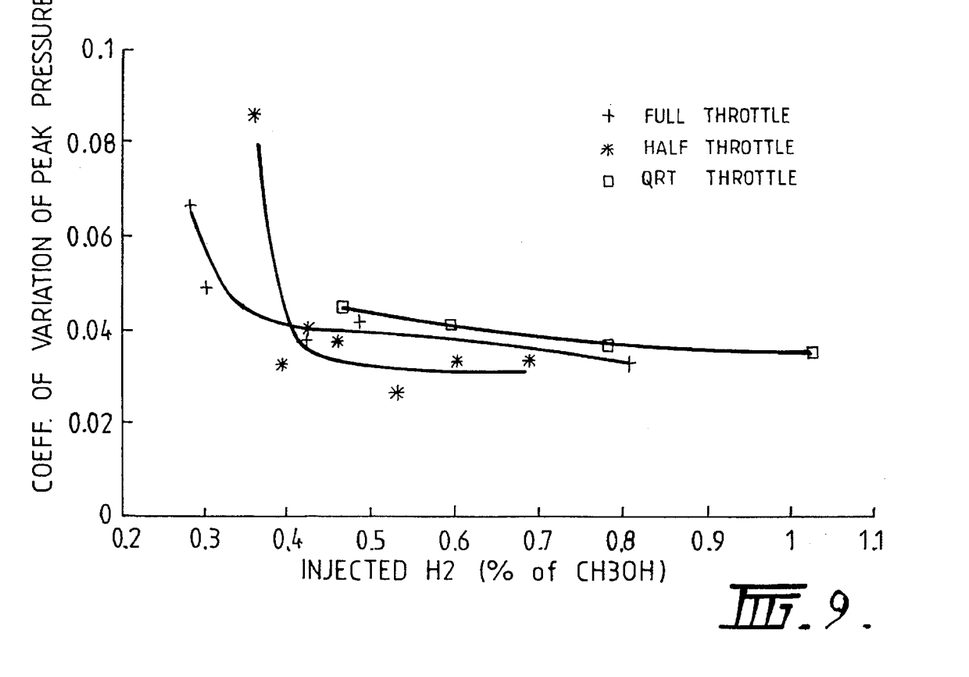
FIG. 9 is a graph showing the variation of COV of peak pressure with amount of pre-chamber H2 injection at the same optimum efficiency mixtures and throttle settings.

The effects of changing the pre-chamber $H_2$ quantity are demonstrated in FIGS. 7 to 10. In FIG. 7 there is a tendency for η to increase slightly with reducing quantities of injected $H_2$. The ignition timing (FIG. 7), $COVw_c$ (FIG. 8) and COVp^ (FIG. 9) indicate that for each throttle opening a point is reached at which combustion variability increases and more advance is needed to compensate. This is consistent with previous findings using conditional sampling of the exhaust from fast and slow burn cycles. Corresponding with the increases in variability are increases in HC and some increase in CO emissions.

Figure 10:
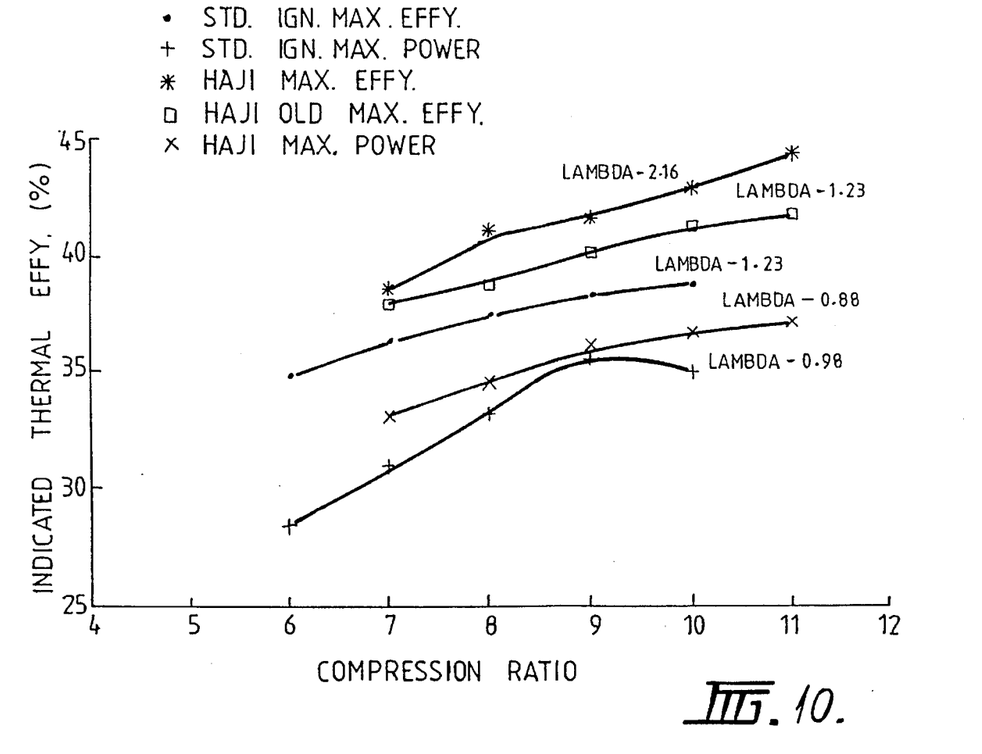
FIG. 10 is a graph showing the effect of increasing compression ratio on indicated thermal efficiency for standard ignition and hydrogen assisted jet ignition.

A further benefit from the changed ignition system is the increase in highest usable compression ratio, HUCR. In FIG. 10 the thermal efficiency η for the standard ignition system is shown at maximum efficiency (λ=1.23) and maximum power (λ=0.98) mixtures, and the corresponding values (λ=2.15) and (λ=0.98) with the HAJI system. In addition the value of η at 'old max effy' λ=1.23 with the HAJI system is also included for comparison at equal λ.

Figure 11:
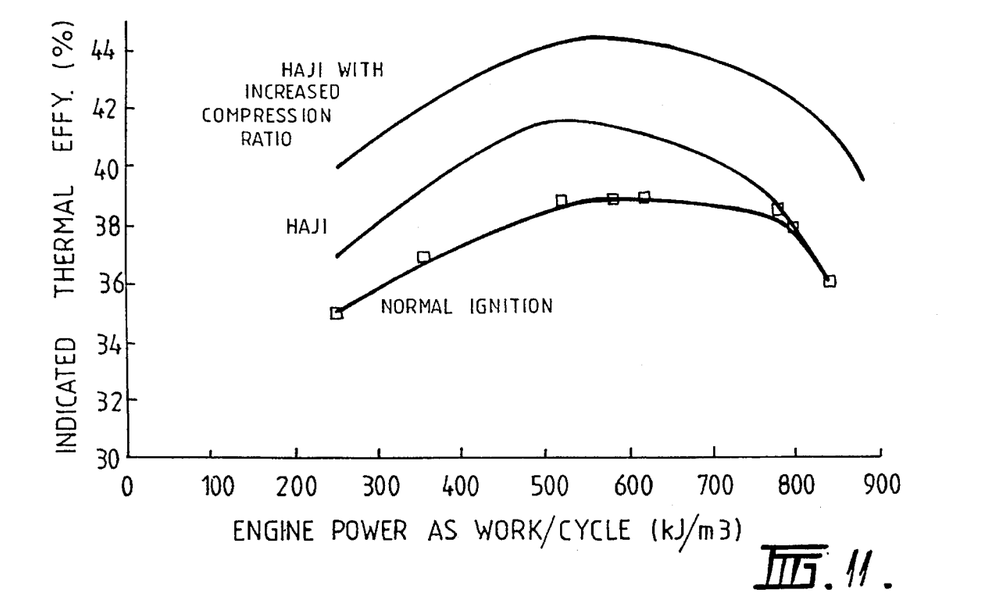
FIG. 11 is a graph showing indicated changes in indicated thermal efficiency with engine power as work/cycle for normal ignition, and for the invention with increased compression ratio.

With standard ignition, peak efficiency at maximum power mixture, λ=0.90 occurs at r=9. At r=10, η falls because knock is encountered. The HAJI system at r=9, and with λ=1.23, the optimum for maximum η with standard ignition, shows nearly 2% absolute (or 5% relative) increase in η. This increase is considered to be a consequence of the faster burn rate and the improved combustion variability reducing the overall consequences of the combustion time loss. Further increase in λ to increase efficiency (to λ=2.16) is possible and allows an increase of nearly 2% more in η. Moreover, because of the reduced variability and faster burn times FIG. 10 shows that r can be increased to 11. At r=12, knock is encountered at maximum power mixture. At r=11 and λ–2.16, there is a further increase in η of 3%. The total improvement in maximum efficiency of just over 6% absolute represents a relative increase of 15% in η. The improvement in engine power achieved by the invention with increased compression ratio is illustrated in FIG. 11.

The indication that the HAJI can support conventionally port-injected s.i. engine combustion at mixtures leaner than those reported in the literature is exemplified at 1200 rev/min engine speed, where COVp^ of less than 0.05 can be sustained at λ=4.5. The quantity of hydrogen needed to sustain such operation is about one tenth that which would be needed if added homogeneously mixed with the fuel. These is some evidence of increased variability which might be associated with partial burns in the ultra lean mixtures as the COVw$_c$ increases to values associated with standard ignition. However, the increases in IIC and CO emission under the full and half throttle conditions are attributed to the thickening of the wall quench layers and reduced oxidation of the hydrocarbons in the substantial crevices of the CFR engine piston. The benefit from throttling in reducing the IIC and CO is the result of the increased fraction of hot residuals in the charge, increasing the cycle temperatures as evidenced by the twofold increase in NOx from 0.6 to 1.2 ppm as the throttle is reduced from full to one quarter.

The reason for the optimum H$_2$ injection timing occurring quite late in the compression process (i.e. at 100° BTDC) is, with earlier injection, that the lower cylinder pressure allow hydrogen to flow into the main chamber. It is important to note that if there is no outflow of hydrogen, the pre-chamber will be fuel rich for all the reported values of injected H$_2$. The increase in COVp^ (FIG. 9) at low H$_2$ values may be the result of injector variability as it approached its minimum open time of 2 ms. The extremely wide rich flammability limits of hydrogen appear to render the process moderately insensitive to the amount of injected H$_2$.

Our test results showed that MBT spark timing was after TDC for maximum power mixture. This is an unexpected result because, as the burn rate approaches that of the Otto cycle's constant volume combustion, equal distribution of the burn process around TDC would be expected to maximize the cycle work.

The above demonstration of the CFR engine, working at up to 70% maximum torque with NOx emission close to ambient levels, is most encouraging finding as extrapolation of these research engine data to automobile application would remove the requirement for stoichiometric operation needed for the '3-way' catalyst. The hydrogen assisted jet ignition used to achieve this also confers extremely stable combustion with COV's of the peak cylinder pressure and specific work per engine cycle reduced by 50 to 80% of that normally achieved with this engine, allowing increased thermal efficiency at ultra lean operation, at relative air/fuel ratios of about 2, and about two numbers increase in the highest useful compression ratio. The result is an improvement in maximum indicated thermal efficiency of about 15% simultaneously with the low NOx emissions. The hydrocarbon emissions remain high and if realized in automotive engines would require after engine clean up.

Near elimination of idle combustion variability by our novel form of "jet" ignition using a small amount of hydrogen addition has been achieved. At the same time low levels of emissions have also been observed. Idle stability will improve vehicle driveability whilst cruising at low engine speeds and high gears when the engine operates near idle speed. In addition reduced emissions will be obtained during vehicle deceleration.

The following conclusions can be drawn from our results:

1. In a conventional ignition system, the cycle-by-cycle variability (CBCV) is initiated in the growth of the ignition kernel, subsequent to spark, during the period when the flame kernel grows to about the scale of the largest eddies. Three classifications of flame kernels were made, namely (a) stationary kernels, (b) translating kernels and (c) splitting kernels. Subsequent slow burning with stationary kernels has been seen while other types of kernels subsequently have fast burning.

2. A novel way of controlling combustion variability for a large range of equivalence ratios in the S.I. engine has been obtained with jet ignition using small amounts of hydrogen addition. At the same time improvement in efficiency and significant reduction in emissions are obtained. A major outcome is that CBCV is not increased with lean mixtures, which is different from that occurring in the conventionally ignited S.I. engine.

3. Unthrottled operation of the S.I. engine with near elimination of NOx emission is possible with this novel method at some sacrifice in efficiency.

4. Idle combustion variations have been nearly eliminated together with low level of emissions.

I claim:

1. An ignition device for association with an internal combustion engine having a combustion chamber of predetermined clearance volume, comprising a small pre-chamber having a volume of 0.5 or less than 2% of the clearance volume, said pre-chamber having at least one outlet orifice opening into the combustion chamber, means for creating a rapidly combustible hydrogen-rich mixture of about 1.2 to 7 times stoichiometric in said pre-chamber, and means for igniting the combustible mixture in the pre-chamber, said pre-chamber and said at least one orifice being dimensioned to have a dimensionless throat parameter β=

$$\frac{\text{area of throat} \times \text{bore of combustion cylinder}}{\text{pre-chamber volume}}$$

within the range of 0.3 to 0.8, thereby causing an ignition jet to issue from said at least one orifice into the combustion chamber so as to promote efficient combustion within the internal combustion engine.

2. The ignition device of claim 1, wherein the volume of the pre-chamber is greater than about 0.5% and less than about 0.8% of the volume of the combustion chamber.

3. The ignition device of claim 2, wherein the throat parameter is about 0.4 to 0.7.

4. The ignition device of claim 1, wherein the hydrogen rich mixture is about 3 times stoichiometric.

5. The ignition device of claim 1, wherein the pre-chamber is formed as part of a structure which is adapted to engage a standard spark plug opening of an internal combustion engine.

6. The ignition device of claim 5, wherein said pre-chamber forms part of a spark plug structure.

7. The ignition device of claim 1, wherein said means for creating a combustible mixture in said pre-chamber comprises means for injecting rapidly burning fuel into said pre-chamber.

8. The ignition device of claim 1, wherein said pre-chamber includes a reforming catalyst and heating means for generating a rapidly burning mixture within said pre-chamber.

9. An internal combustion engine having an ignition device according to claim 1.

10. A method of operating a internal combustion engine having a combustion chamber of predetermined clearance volume, comprising the steps of associating with the combustion chamber a pre-chamber having a volume of 0.5 to less than 2% of the predetermined volume and comprising at least one orifice opening into the combustion chamber, introducing into the pre-chamber a rapidly combustible hydrogen-rich mixture of about 1.2 to 7 times stoichiometric, and igniting the mixture in the pre-chamber to create a burning fuel ignition jet from said at least one orifice to promote efficient combustion within the combustion chamber, said pre-chamber and said at least one orifice being dimensioned to have a dimensionless throat parameter $$\beta = \frac{\text{area of throat} \times \text{bore of combustion cylinder}}{\text{pre-chamber volume}}$$

within the range 0.3 to 0.8.

11. The method of claim 10, wherein the dimensionless throat parameter is about 0.4 to 0.7.

12. In combination, an internal combustion engine having a combustion chamber of predetermined clearance volume and an ignition device comprising a small pre-chamber having a volume of 0.5 to less than 2% of the clearance volume, said pre-chamber having at least one outlet orifice opening into the combustion chamber, means for creating a rapidly combustible hydrogen-rich mixture of about 1.2 to 7 times stoichiometric in said pre-chamber, and means for igniting the combustible mixture in the pre-chamber, said pre-chamber and said at least one orifice being dimensioned to have a dimensionless throat parameter $$\beta = \frac{\text{area of throat} \times \text{bore of combustion cylinder}}{\text{pre-chamber volume}}$$

within the range of 0.3 to 0.8, thereby causing an ignition jet to issue from said at least one orifice into said combustion chamber so as to promote efficient combustion within the internal combustion engine.

* * * * *